United States Patent
Hunt

(10) Patent No.: US 12,004,452 B2
(45) Date of Patent: Jun. 11, 2024

(54) RADAR-TRANSPARENT COMPONENTS FOR HEADERS OF AGRICULTURAL VEHICLES AND RELATED SYSTEMS

(71) Applicant: CNH Industrial America LLC, New Holland, PA (US)

(72) Inventor: Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 642 days.

(21) Appl. No.: 17/083,663

(22) Filed: Oct. 29, 2020

(65) Prior Publication Data

US 2022/0132740 A1    May 5, 2022

(51) Int. Cl.
*A01D 57/02* (2006.01)
*A01D 80/02* (2006.01)

(52) U.S. Cl.
CPC ............. *A01D 57/02* (2013.01); *A01D 80/02* (2013.01)

(58) Field of Classification Search
CPC ........ A01D 57/02; A01D 80/02; A01D 78/02; A01D 78/14; A01D 41/127
See application file for complete search history.

(56) References Cited

U.S. PATENT DOCUMENTS

| | | | |
|---|---|---|---|
| 3,066,470 A | 12/1962 | Johnston | |
| 3,468,109 A * | 9/1969 | Reimer | A01D 57/02 56/220 |
| 3,613,346 A * | 10/1971 | Hubbard | A01D 57/02 24/DIG. 48 |
| 3,626,678 A * | 12/1971 | Quam | A01D 89/002 56/400 |
| 3,771,299 A | 11/1973 | Gradwohl et al. | |
| 4,472,928 A * | 9/1984 | Easton | A01D 57/02 56/220 |
| 4,882,899 A | 11/1989 | Jasper et al. | |
| 5,024,050 A * | 6/1991 | Leidenix | A01D 57/02 56/220 |
| 5,551,221 A * | 9/1996 | Sund | A01D 41/06 460/122 |

(Continued)

FOREIGN PATENT DOCUMENTS

| | | |
|---|---|---|
| CN | 102823384 A | 12/2012 |
| DE | 2924431 C2 | 3/1983 |

(Continued)

OTHER PUBLICATIONS

Extended European Search Report for EP Application No. 21205187.4 dated Mar. 3, 2022 (12 pages).

*Primary Examiner* — Thomas B Will
*Assistant Examiner* — Julia C Tran
(74) *Attorney, Agent, or Firm* — Peter K. Zacharias; Rebecca L. Henkel; Rickard K. DeMille

(57) ABSTRACT

A system for detecting one or more parameters associated with a header configured for use with an agricultural vehicle includes a header component and a radar sensor supported relative to the header component. The radar sensor has a field of view along which the radar sensor is configured to transmit radio waves for reflection off a surface. At least a portion of the header component is positioned within the field of view of the radar sensor or passes through the field of view of the radar sensor and is formed from one or more radar-transparent materials.

20 Claims, 4 Drawing Sheets

(56) References Cited

U.S. PATENT DOCUMENTS

| | | | |
|---|---|---|---|
| 6,199,358 B1* | 3/2001 | Majkrzak | A01D 57/02 |
| | | | 56/220 |
| 9,894,841 B2 | 2/2018 | Schrattenecker | |
| 2003/0184747 A1* | 10/2003 | Diekhans | A01D 41/127 |
| | | | 342/123 |
| 2005/0091955 A1* | 5/2005 | Glazik | A01D 57/02 |
| | | | 56/220 |
| 2007/0266692 A1* | 11/2007 | Lolley | A01D 89/002 |
| | | | 56/364 |
| 2010/0281840 A1* | 11/2010 | Remillard | A01D 57/02 |
| | | | 56/220 |
| 2016/0120119 A1 | 5/2016 | Jasper | |
| 2018/0332768 A1* | 11/2018 | Isaac | A01D 41/06 |
| 2019/0269072 A1* | 9/2019 | Modak | A01D 57/04 |
| 2019/0307070 A1* | 10/2019 | Dima | A01D 57/04 |
| 2022/0046854 A1* | 2/2022 | Pickett | A01D 41/127 |

FOREIGN PATENT DOCUMENTS

| | | |
|---|---|---|
| DE | 102016115686 A1 | 3/2018 |
| DE | 102016116808 A1 | 3/2018 |
| DE | 102017112224 A1 | 12/2018 |

\* cited by examiner

RADAR-TRANSPARENT COMPONENTS FOR HEADERS OF AGRICULTURAL VEHICLES AND RELATED SYSTEMS

FIELD OF THE INVENTION

The present subject matter relates generally to agricultural vehicles and, more particularly, to radar-transparent components for a header configured for use with an agricultural vehicle, such as a combine or other agricultural harvester, and related radar-based systems.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field and a feeder housing which transports the crop material into a threshing rotor. The threshing rotor rotates within a perforated housing, which may be in the form of adjustable concaves, and performs a threshing operation on the crop to remove the grain. The threshing rotor is provided with rasp bars that interact with the crop material in order to further separate the grain from the crop material, and to provide positive crop movement. Once the grain is threshed, the grain is cleaned using a cleaning system. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. Clean grain is transported to a grain tank onboard the combine.

A typical header generally includes a frame, a pair of end dividers at the lateral ends of the frame, a floor such as a deck, a cutter to remove crop material from the field, and a conveyor to transport the cut crop material to the feeder housing for further downstream processing in the combine. Generally, the components of a header are specifically optimized to harvest a particular kind of crop. For instance, the header may be in the form of a draper header which has a cutter bar, a draper belt, and a rotating reel with tines or the like in order to harvest a bushy or fluffy crop, such as soy beans or canola. Alternatively, the header may be in the form of a row crop header which includes an auger and row units with snouts, gathering chains, and stalk rolls in order to harvest corn.

Within the industry, there is an ever-increasing demand for systems designed to automatically control the operation of components associated with agricultural vehicles, including components associated with headers of agricultural harvesters. Typically, automated header-related systems rely on the use of sensors or sensing devices to provide feedback associated with a monitored parameter or operating condition of the header, which then allows a controller to automatically determine control outputs for controlling the operation of one or more components of the header based on the feedback received from the sensor(s) or sensing device(s). For instance, it is known to use non-contact sensors, such as radar sensors, to monitor the height of a header relative to the ground. However, the use of radar sensors within header-related systems often presents challenges, particularly in relation to positioning the sensors relative to the various components of the header. Specifically, to avoid interference or absorption of the radio waves, radar sensors are often cantilevered off the front of a header to allow the sensors to have a direct line-of-sight to the surface or feature being detected. Unfortunately, this type of mounting arrangement can be problematic, as it requires complex mounting structures and can lead to sensor stability issues and/or accuracy/reliability issues associated with the resulting sensor data.

Accordingly, radar-transparent components for a header configured for use with an agricultural vehicle would be welcomed in the technology. Additionally, radar-based systems utilizing radar sensors that transmit radio waves through header components would also be welcomed in the technology

BRIEF DESCRIPTION OF THE INVENTION

Aspects and advantages of the invention will be set forth in part in the following description, or may be obvious from the description, or may be learned through practice of the invention.

In one aspect, the present subject matter is directed to a reel for a header configured for use with an agricultural vehicle. The reel includes a plurality of tine bar assemblies supported relative to a rotational axis of the reel. Each tine bar assembly includes a tine support member and a plurality of tines coupled to the tine support member. The reel also includes a central support member extending along the rotational axis, and at least one radial support member coupled to the tine support member of each tine bar assembly and being configured to support the plurality of tine bar assemblies relative to the central support member. Moreover, the tine support member of each tine bar assembly is formed from one or more radar-transparent materials.

In another aspect, the present subject matter is directed to a header configured for use with an agricultural vehicle. The header includes a frame and a reel rotatable relative to the frame about a rotational axis. The reel includes a plurality of tines and a plurality of tine-supporting components configured to support the plurality of tines relative to the rotational axis. The plurality of tine-supporting components include a central support member extending along the rotational axis, and a plurality of tine support members spaced apart radially from the central support member, with each tine support member being coupled to a subset of the plurality of tines. The plurality of tine-supporting components also include at least one radial support member coupled to the plurality of tine support members and being configured to support the plurality of tine support members relative to the central support member. Moreover, at least one of the plurality of tine-supporting components is formed from one or more radar-transparent materials.

In a further aspect, the present subject matter is directed to a system for detecting one or more parameters associated with a header configured for use with an agricultural vehicle. The system includes a header component, and a radar sensor supported relative to the header component and having a field of view along which the radar sensor is configured to transmit radio waves for reflection off a surface. At least a portion of the header component is positioned within the field of view of the radar sensor or passes through the field of view of the radar sensor, with such portion of the header component being formed from one or more radar-transparent materials.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
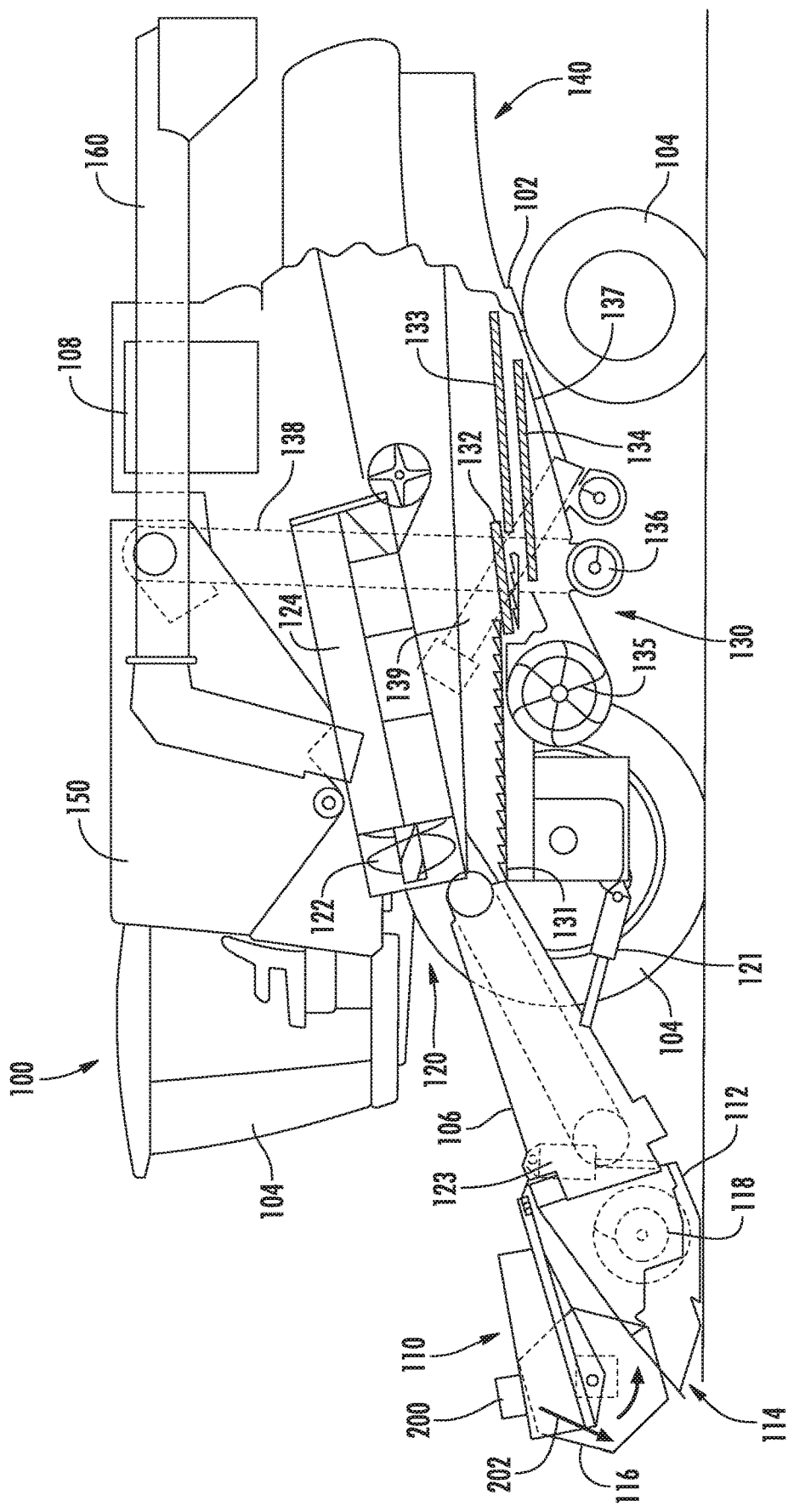
FIG. 1 illustrates a side, partial sectional view of one embodiment of an agricultural vehicle including a header in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to radar-transparent components for headers configured for use with agricultural vehicles, such as combines or other agricultural harvests. In several embodiments, the header component(s) may be formed from one or more radar-transparent materials (e.g., a radar-transparent composite material(s), a radar-transparent polymer material(s) and/or a radar-transparent ceramic material(s)) that allows radio waves to be transmitted therethrough without significant absorption/reflection of the energy associated with the waves.

In one aspect of the present subject matter, one or more components of a rotatable reel of a header may be configured to be radar-transparent. Specifically, in several embodiments, one or more of the components of the reel may be formed from one or more radar-transparent materials, such as by forming the tines, the bats or tine support members, the radial support members, and/or the central support member of the reel from a radar-transparent material(s).

Additionally, in accordance with aspects of the present subject matter, the present subject matter is also directed to a radar-based system for detecting one or more parameters associated with a header configured for use with an agricultural vehicle. Specifically, in several embodiments, the system includes a radar sensor having a field of view directed through or otherwise aligned with one or more components of the header. In such embodiments, the header component(s) that is aligned with and/or that passes through the sensor's field of view may be formed from a radar-transparent material(s) to allow the radio waves from the radar sensor to be transmitted through the component(s), reflect off a given surface, and be directed back through the component(s) for detection by the sensor.

Referring now to the drawings, FIG. 1 illustrates one embodiment of an agricultural vehicle 100 in accordance with aspects of the present subject matter. As shown in FIG. 1, the agricultural vehicle 100 is configured as a combine. However, in other embodiments, the agricultural vehicle 100 may be in the form of any other suitable agricultural vehicle, such as a windrower or any other suitable harvester.

As shown in the illustrated embodiment, the agricultural vehicle 100 generally includes a chassis 102, ground engaging wheels and/or tracks 104, a feeder housing 106, and a prime mover 108. The combine 100 may also include a header 110, a separating system 120, a cleaning system 130, a discharge system 140, an onboard grain tank 150, and an unloading auger 160.

The threshing system 120 may be of the axial-flow type, and thereby may include an axially displaced threshing rotor 122 which is at least partially enclosed by a rotor housing 124. The rotor housing 124 can include a rotor cage and perforated concaves. The cut crop is threshed and separated by the rotation of rotor 122 within the rotor housing 124 such that larger elements, for example stalks, leaves, and other MOG is discharged out of the rear of agricultural vehicle 100 through the discharge system 140. Smaller elements of crop material, such as grain and non-grain crop material, including particles lighter than grain, such as chaff, dust and straw, may pass through the perforations in the concaves and onto the cleaning system 130.

The cleaning system 130 may include a grain pan 131, a sieve assembly which can include an optional pre-cleaning sieve 132, an upper sieve 133 (also known as a chaffer sieve), a lower sieve 134 (also known as a cleaning sieve), and a cleaning fan 135. The grain pan 131 and pre-cleaning sieve 132 may oscillate in a fore-to-aft manner to transport the grain and finer non-grain crop material to the upper sieve 133. The upper sieve 133 and lower sieve 134 are vertically arranged relative to each other, and may also oscillate in a fore-to-aft manner to spread the grain across sieves 133, 134, while permitting the passage of clean grain, by gravity, through openings in the sieves 133, 134. The fan 135 may provide an airstream through the sieves 132, 133, 134 to blow non-grain material, such as chaff, dust, and other impurities, toward the rear of the agricultural vehicle 100.

The cleaning system 130 may also include a clean grain auger 136 positioned crosswise below and toward the front end of the sieves 133, 134. The clean grain auger 136 receives clean grain from each sieve 133, 134 and from a bottom pan 137 of the cleaning system 130. The clean grain auger 136 conveys the clean grain laterally to a generally vertically arranged grain elevator 138 for transport to the grain tank 150. The cleaning system 130 may additionally include one or more tailings return augers 139 for receiving tailings from the sieves 133, 134 and transporting these tailings to a location upstream of the cleaning system 130 for repeated threshing and/or cleaning action. Once the grain tank 150 becomes full, the clean grain therein may be transported by the unloading auger 160 into a service vehicle.

The header 110 is removably attached to the feeder housing 106. The header 110 generally includes a frame 112, a cutter bar 114 that severs the crop from a field, a rotatable reel 116 rotatably mounted to the frame 112, which feeds the cut crop into the header 110, and a conveyor 118, e.g. an auger 118 with flighting, that feeds the severed crop inwardly from each lateral end of the frame 112 toward feeder housing 106. The header 110 may be in the form of any desired header, such as a draper header or a corn header.

In several embodiments, the header 110 may be provided in operative association with an actuating system including one or more actuating cylinders, such as one or more hydraulic cylinders. In one embodiment, the actuating system may be used to adjust a height of the header 110 relative to the ground so as to maintain the desired cutting height between the header 110 and the ground. For instance, as shown in FIG. 1, the actuating system may include a height cylinder 121 (e.g., coupled between the feeder housing 106 and a portion of the chassis 102 of the vehicle 100) that is configured to adjust the height or vertical positioning of the header 110 relative to the ground by pivoting the feeder housing 106 to raise and lower the header 110 relative to the ground. In addition, the actuating system may also include a tilt cylinder(s) 123 coupled between the header 110 and the feeder housing 106 to allow the header 110 to be tilted relative to the ground surface or pivoted laterally or side-to-side relative to the feeder housing 106.

Moreover, in accordance with aspects of the present subject matter, the agricultural vehicle 100 and/or the header 110 may include one or more radar sensors 200 installed thereon and/or otherwise supported thereby. For example, as shown in FIG. 1, one or more radar sensors 200 may, in several embodiments, be installed on the header 110 at a location that requires the sensor(s) 200 to transmit and/or receive radio waves through a portion of the reel 116, such as by installing the sensor(s) 200 at a location relative to the reel 116 so that a field of view of the sensor(s) 200 is aligned with a portion of the reel 116. In such embodiments, the radar sensor(s) 200 may be required to transmit waves through the rotating reel 116 to the desired detection surface (e.g., as indicated by arrow 202 in FIG. 1) and detect the reflected waves transmitted back through the rotating reel 116 to the sensor(s) 200. In this regard, to facilitate the transmission/detection of the radio waves by the radar sensor(s) 200, one or more of the components of the reel 116 may be configured as a radar-transparent component(s). For instance, as will be described below with reference to FIGS. 2 and 3, all or a portion of the reel 116 may be formed from a radar-transparent material. It should also be appreciated that, in addition to the reel 116 (or as an alternative thereto), any other suitable header-based components may be configured as radar-transparent components, such as one or more components of the frame 112, cutter bar 114, conveyer 118, and/or the like that may be aligned with the field of view of the radar sensor(s) 200 and/or that may otherwise impact the operation of the sensor(s) 200.

Figure 2:
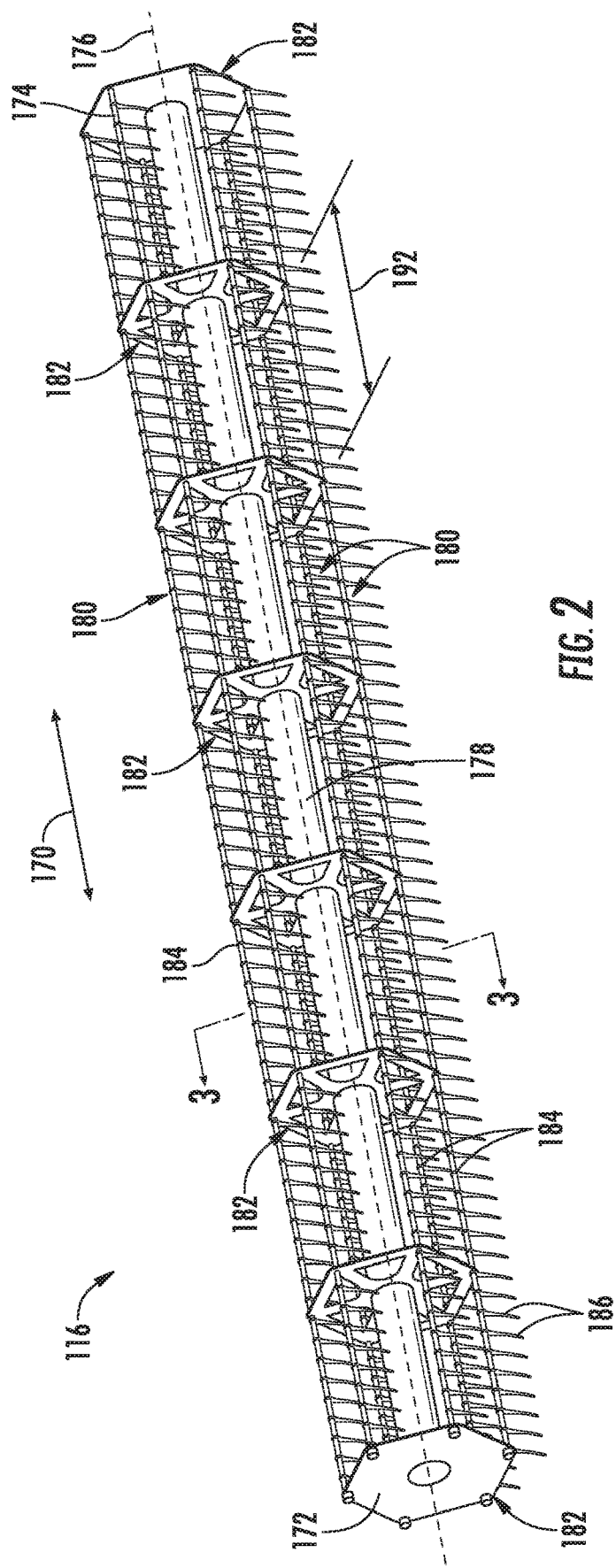
FIG. 2 illustrates a perspective view of one embodiment of a reel suitable for use within a header in accordance with aspects of the present subject matter.
Figure 3:
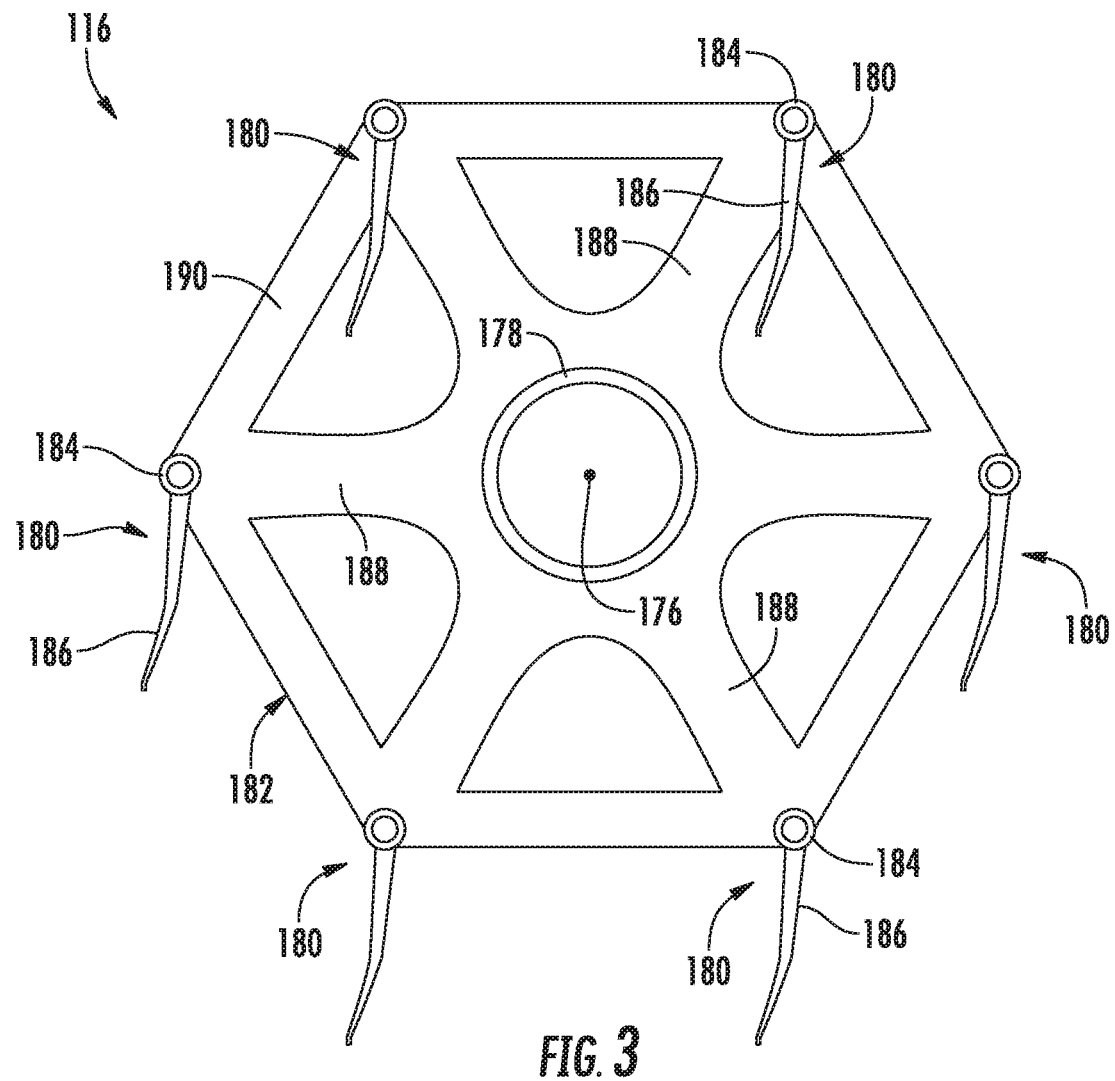
FIG. 3 illustrates a cross-sectional view of the reel shown in FIG. 2 taken about line 3-3.

Referring now to FIGS. 2 and 3, different views of one embodiment of a reel suitable for use within a header, such as the reel 116 described above with reference to FIG. 1, are illustrated in accordance with aspects of the present subject matter. Specifically, FIG. 2 illustrates a perspective view of the reel 116 and FIG. 3 illustrates a cross-sectional view of the reel 116 shown in FIG. 2 taken about line 3-3.

As shown in FIG. 2, the reel 116 generally extends in an axial or lateral direction (indicated by arrow 170) between a first lateral end 172 and a second lateral end 174 and is configured to rotate about a central rotational axis 176 extending parallel to the lateral direction 170. A central support tube or member 178 of the reel 116 extends laterally between the first and second lateral ends 172, 174 along the central rotational axis 176. Additionally, the reel 116 includes a plurality of tine bar assemblies 180 supported relative to the central support member 178 via one or more radial support member(s) 182 that extend radially between the central support member 178 and the tine bar assemblies 180. As shown in FIG. 2, the reel 116 includes a plurality of radial support members 182 spaced apart from one another along the length or lateral width of the reel 116, with the support members 182 positioned at the lateral ends 172, 174 of the reel 116 being configured as radially extending plates and the support members 182 spaced apart between the lateral ends 172, 174 of the reel 116 being configured as spoked support members including a plurality of spiders or spokes 188 (FIG. 3). For instance, as shown in FIG. 3, each spoke 188 may be configured to extend radially outwardly from the central support member 176 to an outer web 190 of the radial support member 182. In such an embodiment, the tine bar assemblies 180 of the reel 116 may be coupled to the outer web 190 of each radial support member 182.

As in FIGS. 2 and 3, each tine bar assembly 180 may include a bat tube or tine support member 184 extending in the lateral direction 170 between the first and second lateral ends 172, 174 of the reel 116. Additionally, each tine bar assembly 180 includes a plurality of tines 186 (e.g., with each assembly 180 including a subset of the total number of tines of the reel 116) coupled to and extending from the tine support member 184, with the various tines 186 being spaced apart from one another in the lateral direction 170 along the length of the respective tine support member 184. As shown in FIG. 3, the tine bar assemblies 180 are generally configured to be supported relative to the central support member 178 around the outer perimeter of the reel 116 via the radial support members 182 in a circumferentially spaced arrangement. Specifically, in the illustrated embodiment, the tine bar assemblies 180 are generally spaced apart evenly around the outer perimeter of the reel 116, with the reel 116 including six tine bar assemblies 180 spaced apart from one another by 60 degrees. However, it should be appreciated that, in other embodiments, the reel 116 may include any other suitable number of tine bar assemblies 180 having any other suitable circumferential spacing around the outer perimeter of the reel 116.

In accordance with aspects of the present subject matter, one or more components of the reel 116 may be configured as a radar-transparent component(s). Specifically, in several embodiments, the tines 186, tine support members 184, radial support members 182, and/or central support member 178 may be formed from a radar-transparent material that allows radio waves to pass therethrough without any significant absorption/reflection of the radar energy. In one embodiment, the entirety of the reel 116 may be formed substantially from a radar-transparent material, such as by forming the tines 186, tine support members 184, radial support members 182, and central support member 178 all from a radar-transparent material. Alternatively, one or more select components of the reel 116 may be formed from a radar-transparent material. For instance, as will be described below with reference to the system of FIG. 4, in one embodiment, the components of the reel 116 that are located within (or have the potential to be located within) the field of view of an associated radar sensor(s) 200 may be formed from a radar-transparent material to allow the radio waves transmitted by the sensor(s) 200 (and subsequently reflected off a given surface) to pass through such reel components.

In general, as used herein, the term "radar-transparent material" refers to a material(s) that allows for radio waves to pass therethrough without substantial loss of the wave energy due to absorption of the radio waves into the material via conversion of the waves into another form of energy (e.g., heat) and/or due to reflection of the radio waves.

Specifically, in several embodiments, radar-transparent materials will have a low dielectric constant and a low loss tangent. For instance, in one embodiment, radar-transparent materials suitable for use will have a dielectric constant of less than 30, such as a dielectric constant of less than 20 or less than 15 or less than 10, or less than 5, and/or any other subranges therebetween. Additionally, in one embodiment, radar-transparent materials suitable for use will have a loss tangent of less than 0.20 at radar frequency bands, such as a loss tangent of less than 0.15 or less than 0.10 or less than 0.05 or less than 0.01, and/or any other subranges therebetween.

In several embodiments, suitable radar-transparent materials include, but are not limited to, radar-transparent composite materials, radar-transparent polymer materials, and radar-transparent ceramic materials. For instance, suitable radar-transparent composite materials include, but are not limited to, fiberglass or synthetic-fiber composite materials, such as composites including a fiberglass-based or KEVLAR-based reinforcement structure within a suitable radar-transparent matrix material (polyetherimide (PEI) and/or any other suitable radar-transparent resins), and/or any other suitable radar-transparent composite materials. Similarly, suitable radar-transparent polymer materials include, but are not limited to, polypropylene (PPL), polyvinyl chloride (PVC), polytetrafluoroethylene (PTFE), acrylonitrile butadiene styrene (ABS), and/or any other suitable radar-transparent plastic materials. Suitable radar-transparent ceramic materials include, but are not limited to, magnesium aluminate spinel and/or any other suitable radar-transparent ceramic materials.

It should be appreciated that, in several embodiments, different components of the reel 116 may be formed from different radar-transparent materials and/or different types of radar-transparent materials. For instance, in one embodiment, the tines 186 may be formed from a first type of radar-transparent material (e.g., a radar-transparent polymer material) while one or more of the tine-supporting components (e.g., the tine support members 184, the radial support members 182 and/or the central support member 178) may be formed from a second type of radar-transparent material (e.g., a radar-transparent composite material).

It should also be appreciated that, in addition to forming one or more of the primary reel components from a radar-transparent material(s), various other components of the reel 116 may also be formed from a radar-transparent material(s). For instance, in one embodiment, all or a portion of the fasteners used within the reel 116 may be formed from a radar-transparent material(s), such as the fasteners used to couple: the tines 186 to the tine support members 184; the tine support members 184 to the radial support members 182; and/or the radial support members 182 to the central support member 178. A suitable connection method (including associated fasteners) for coupling tines to corresponding tine support members is described, for example, in U.S. Pat. No. 10,674,668 (entitled "Reel Tine for a Harvesting Reel and a Method of Assembling a Tine to a Harvesting Reel" and issued Jun. 9, 2020), the disclosure of which is hereby incorporated by reference herein in its entirety for all purposes. The connection method of U.S. Pat. No. 10,674,668 may, for example, be implemented in association with the reel 116 described herein by forming the associated fasteners from a radar-transparent material.

Figure 4:
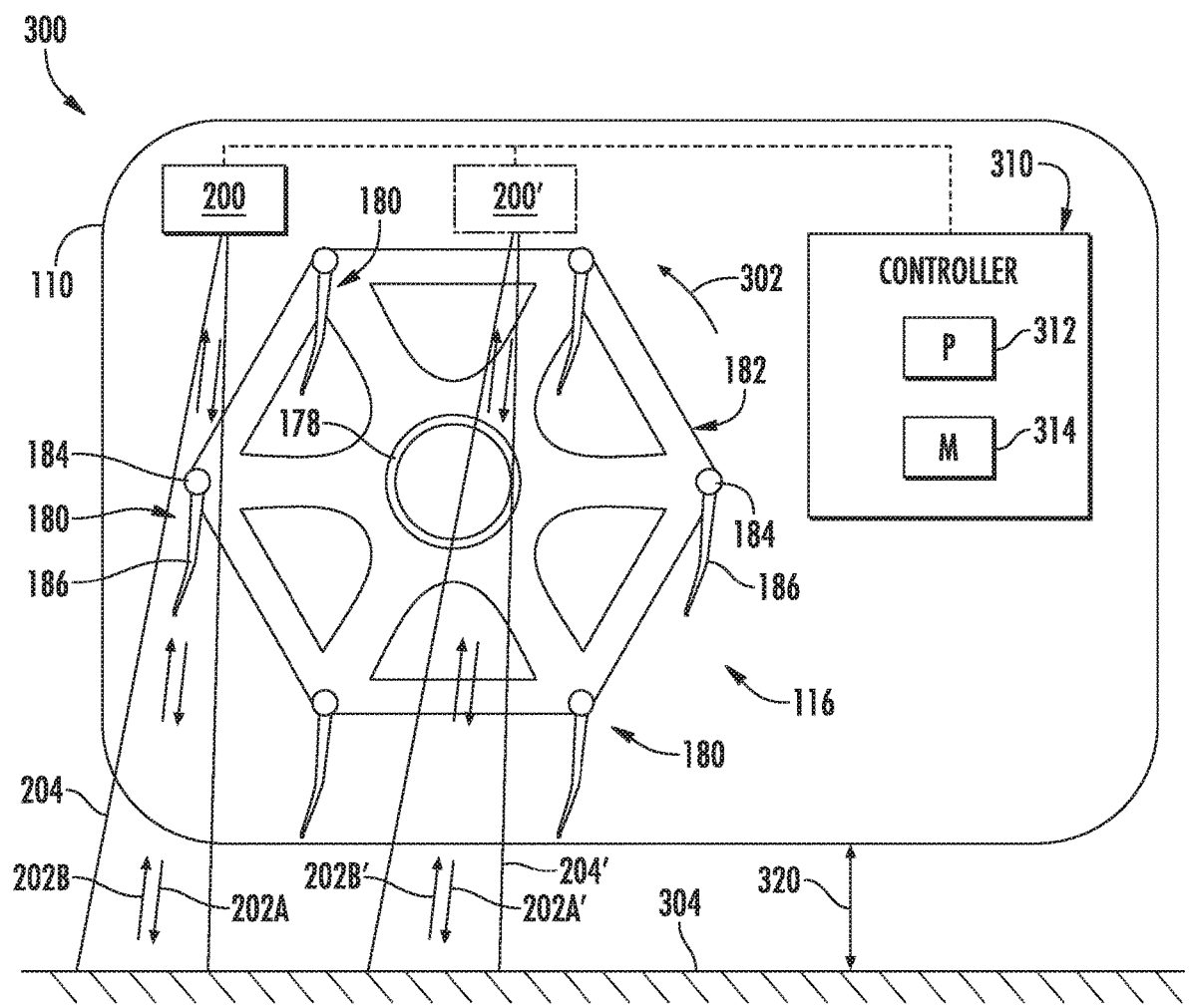
FIG. 4 illustrates a schematic view of one embodiment of a radar-based system for detecting one or more parameters associated with a header configured for use with an agricultural vehicle in accordance with aspects of the present subject matter.

Referring now to FIG. 4, one embodiment of a radar-based system 300 for detecting one or more parameters associated with a header configured for use with an agricultural vehicle is illustrated in accordance with aspects of the present subject matter. For purposes of discussion, the system 200 will generally be described herein with reference to the header 110 and reel 116 described above with reference to FIGS. 1-3, including the radar-transparent components of the reel 116. However, it should be appreciated that the system 300 may be utilized with headers and/or reels having any other suitable header/reel configuration. Additionally, in other embodiments, the radar-based system 300 may be provided in association with any other suitable components of a header that have been formed from a radar-transparent material to allow radio waves to pass therethrough without significant absorption/reflection of the radar energy.

In general, the system 300 includes one or more radar sensors 200 supported relative to a reel 116 of a header (indicated schematically in FIG. 6 by box 110). As is generally understood, the reel 116 may be powered via a motor (or other suitable rotational drive source) such that the reel 116 is rotationally driven relative to the sensor(s) in a given rotational direction (e.g., as indicated by arrow 302). In the illustrated embodiment, the system 300 is shown as including a single radar sensor 200 installed on or otherwise supported by the header 110. However, in other embodiments, multiple radar sensors 200 may be installed on or otherwise supported by the header 110, such as by installing a plurality of radar sensors 200 at spaced apart locations along the lateral width of the header 110. It should also be appreciated that, as an alternative to installing the radar sensor(s) 200 on the header 110, the sensor(s) 200 may, instead, be installed at any other suitable location relative to the header 110. For instance, in one embodiment, the sensor(s) 200 may be installed on the agricultural vehicle 110 (FIG. 1) (e.g., on the cab roof).

In several embodiments, the radar sensor(s) 200 may be positioned at a location vertically above the reel 116 (e.g., at a location on the header 110 vertically above the reel 116 or at a location on the associated vehicle 100 vertically above the reel 116) and may be oriented relative to the reel 116 such that the sensor(s) 200 has a field of view 204 directed through a portion of the reel 116. For instance, as shown in FIG. 4, the radar sensor(s) 200 is installed on the header 110 such that the field of view 204 of the sensor(s) 200 incorporates an area through which the tine bar assemblies 180 will pass with rotation of the reel 116. As a result of this sensor positioning and/or orientation relative to the reel 116, the tine bar assemblies 180 will pass through the sensor's field of view 204 at a frequency that is generally proportional to the rotational speed of the reel 116. In such an embodiment, the tine bar assemblies 180 of the reel 116 may be formed from a radar-transparent material(s) (e.g., by forming the tines 186 from a radar-transparent polymer material and by forming the tine support members 184 from a radar-transparent composite material) to allow the outgoing and return radio waves (e.g., as indicated by arrows 202A, 202B) to pass through the tine bar assemblies 180. Accordingly, when a given tine bar assembly 180 passes through the sensor's field of view 204, the outgoing radio waves 202A transmitted from the sensor(s) 200 will pass through the tine bar assemblies 180 for reflection off the surface to be detected (e.g., the ground surface 304) and can pass back through the tine bar assemblies 180 as return waves 202B for receipt or detection by the sensor(s) 200 without any substantial absorption/reflection of the energy associated with the outgoing/return waves 202A, 202B.

As an example of an alternative installation location for the radar sensor(s) (as indicated by dashed box 200' in FIG. 4), the sensor(s) 200' may, instead, be installed on the reel 116 such that a field of view 204' of the sensor(s) 200 incorporates not only an area through which the tine bar assemblies 180 pass with rotation of the reel 116, but also the central support member 178 of the reel. In such an embodiment, both the tine bar assemblies 180 and the central support member 178 may be formed from a radar-transparent material(s) (e.g., by forming the tines 186 from a radar-transparent polymer material and by forming the tine support members 184 and the central support member 178 from a radar-transparent composite material) to allow the outgoing and return radio waves 202A', 202B' to pass through such reel components.

It should be appreciated that, in the embodiments or examples described above, it may also be desirable or necessary to form the radial support members 182 from a radar-transparent material (e.g., a radar-transparent composite material) depending on the lateral positioning of the radar sensor(s) 200, 200' relative to adjacent radial support members 182. For instance, if a radar sensor(s) 200, 200' is installed laterally between two adjacent radial support members 182 such that the field of view 204, 204' of the sensor(s) 200, 200' is aligned with a lateral gap 192 (FIG. 2) defined between the adjacent radial support members 182, such support members 182 may be formed from any suitable material (including conductive materials) given that the support members 182 will not interfere with or absorb/reflect the radio waves. However, if a radar sensor(s) 200, 200' is, instead, laterally aligned with a radial support member 182 or is otherwise positioned relative to a radial support member 182 such that the field of view 204, 204' incorporates the radial support member 182, then such radial support member 182 should also be formed form a radar-transparent material.

As shown in FIG. 3, the system 300 may also include a controller 310 communicatively coupled to the radar sensor(s) 200, 200' that is configured to monitor an operating condition or parameter associated with the header 110 based on the data received from the sensor(s) 200, 200'. For instance, when the radar sensor(s) 200, 200' is configured to provide data associated with a distance between the sensor(s) 200, 200' and a given object or surface, the controller 310 may be configured to monitor such distance based on the data received from the sensor(s) 200, 200'. Specifically, in one embodiment, the radar sensor(s) 200, 200' may be configured to transmit radio waves towards the ground surface 304 and receive the return waves as reflected off the ground surface 304 to allow the sensor(s) 200, 200' to generate data associated with the distance between the sensor(s) 200, 200' and the ground surface 304. In such an embodiment, the sensor data provided by the radar sensor(s) 200, 200' may be used by the controller 310, for example, to monitor a height 320 of the header 110 relative to the ground. For instance, by knowing the installed height of the radar sensor(s) 200, 200' on the header 110, the controller 310 may determine the header height 320 relative to the ground based on the distance-related data received from the radar sensor(s) 200, 200'.

It should be appreciated that the controller 310 may generally correspond to any suitable processor-based device(s), such as a computing device or any combination of computing devices. Thus, in several embodiments, the controller 310 may include one or more processor(s) 312 and associated memory device(s) 314 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 314 of the controller 310 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 314 may generally be configured to store suitable computer-readable instructions that, when implemented by the processor(s) 312, configure the controller 310 to perform various computer-implemented functions, such as the processing and/or control functionality described herein.

It should also be appreciated that the controller 310 may be configured to interface with and/or be incorporated into existing hardware and/or software of the header 110 and/or agricultural vehicle 100. In other words, the controller 310 may be a separate unit as part of the disclosed system 300 and/or be integrated with the header 110 and/or agricultural vehicle 100. For instance, the header 110 may have a dedicated header controller which controls specific header-related functions, and the controller 310 may either be in the form of the dedicated header controller or be incorporated as part of the dedicated header controller.

In embodiments in which the data from the radar sensor(s) 200, 200' is used to monitor the relative height 320 of the header 110, the system 300 shown in FIG. 3 may be configured as a header height control system in which the controller 310 is configured to automatically control the operation of the height cylinder 121 (FIG. 1) and/or the tilt cylinder(s) 123 (FIG. 1)) to adjust the vertical positioning and/or tilt angle of the header 110 relative to the ground surface 304. Specifically, the distance-related signals or data provided by the radar sensor(s) 200, 200' may be used as a control input into the controller 310 for controlling the operation of the height cylinder 121 and/or the tilt cylinder(s) 123. Specifically, the data may be analyzed by the controller 310 in combination with the known spatial relationship between the radar sensor(s) 200, 200' and the header 110 to determine a control output(s) for controlling the operation of the cylinders 121, 123 that maintains the header 110 at the desired position relative to the ground surface 304.

It should be appreciated that, in several embodiments, the controller 310 may be configured to control the operation of the cylinders 121, 123 by automatically controlling the operation of one or more corresponding valve(s) (not shown) configured to regulate the supply of fluid (e.g., hydraulic fluid or air) to each cylinder. For instance, the controller 310 may be coupled to one or more height control valves (not shown) for regulating the supply of fluid to the height cylinder 121 and one or more tilt control valves (not shown) for regulating the supply of fluid to the tilt cylinder(s) 123. In such an embodiment, the controller 310 may be configured to transmit suitable control outputs (e.g., current commands) to each control valve to adjust its associated valve position, thereby allowing the controller 310 to vary the supply of fluid to the corresponding cylinder(s) 121, 123 and, thus, automatically control the retraction/extension of such cylinder(s) 121, 123. Alternatively, in embodiments in which the cylinders 121, 123 correspond to electric-driven actuators (e.g., solenoid actuated cylinders), the controller 310 may be configured to transmit suitable control outputs (e.g., current commands) to each associated solenoid to automatically control the retraction/extension of the respective cylinder(s) 121, 123.

Additionally, it should be appreciated that, in alternative embodiments, the controller 310 may be configured to control the operation of any other suitable components of the header 110 based on the data received from the radar sensor(s) 200, 200'. For instance, the data received from the radar sensor(s) 200, 200' may be used to control the operation of the cutter bar 114 and/or the conveyer 118 of the header 110. In addition to such header-based control (or as an alternative thereto), the data received from the radar sensor(s) 200, 200' may be used by the controller 310 to control the operation of one or more components of the agricultural vehicle 100, such as the prime mover 108 to adjust the ground speed of the vehicle 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for detecting one or more parameters associated with headers configured for use with an agricultural vehicle, the system comprising:
   a header comprising a reel rotatable about a rotational axis, the reel comprising:
      a plurality of tine bar assemblies supported relative to the rotational axis of the reel, each tine bar assembly including a tine support member and plurality of tines coupled to the tine support member;
      a central support member extending along the rotational axis; and
      at least one radial support member coupled to the tine support member of each tine bar assembly and being configured to support the plurality of tine bar assemblies relative to the central support member; and
   a radar sensor supported by the header and having a field of view along which the radar sensor is configured to transmit radio waves for reflection off a surface;
   wherein:
   the tine support member of each tine bar assembly passes through the field of view of the radar sensor with rotation of the reel about the rotational axis; and
   the tine support member of each tine bar assembly is formed from one or more radar-transparent materials.

2. The system of claim 1, wherein the plurality of tines and the tine support member of each tine bar assembly are both formed from the one or more radar-transparent materials.

3. The system of claim 2, wherein the one or more radar-transparent materials comprises a first type of radar-transparent material and a second type of radar-transparent material, wherein the plurality of tines of each tine bar assembly are formed from the first type of radar-transparent material and the tine support member of each tine bar assembly is formed from the second type of radar-transparent material.

4. The system of claim 3, wherein the first type of radar-transparent material comprises a radar-transparent polymer material and the second type of radar-transparent material comprises a radar-transparent composite material.

5. The system of claim 2, wherein at least one of the central support member or the at least one radial support member is also formed from the one or more radar-transparent materials.

6. The system of claim 1, wherein the at least one radial support member is also formed from the one or more radar-transparent materials.

7. The system of claim 1, wherein the central support member is also formed from the one or more radar-transparent materials.

8. A header configured for use with an agricultural vehicle, the header comprising:
   a frame;
   a reel rotatable relative to the frame about a rotational axis, the reel comprising:
      a plurality of tines;
      a plurality of tine-supporting components configured to support the plurality of tines relative to the rotational axis, the plurality of tine-supporting components comprising:
         a central support member extending along the rotational axis;
         a plurality of tine support members spaced apart radially from the central support member, with each tine support member being coupled to a subset of the plurality of tines; and
         at least one radial support member coupled to the plurality of tine support members and being configured to support the plurality of tine support members relative to the central support member; and
   a radar sensor supported by the header relative to the frame and having a field of view along which the radar sensor is configured to transmit radio waves for reflection off a surface;
   wherein:
   at least one of the plurality of tine-supporting components is formed from one or more radar-transparent materials; and
   the least one of the plurality of tine-supporting components is positioned within the field of view of the radar sensor or passes through the field of view of the radar sensor.

9. A system for detecting one or more parameters associated with a header configured for use with an agricultural vehicle, the system comprising:
   a header component; and
   a radar sensor supported by the header component and having a field of view along which the radar sensor is configured to transmit radio waves for reflection off a surface;
   wherein:
   at least a portion of the header component is positioned within the field of view of the radar sensor or passes through the field of view of the radar sensor; and
   the at least a portion of the header component is formed from one or more radar-transparent materials.

10. The system of claim 9, wherein the header component comprises a reel rotatably about a rotational axis.

11. The system of claim 10, wherein the reel comprises a plurality of tine bar assemblies supported relative to the rotational axis, with each tine bar assembly passing through the field of view of the radar sensor with rotation of the reel about the rotational axis, the plurality of tine bar assemblies being formed from the one or more radar-transparent materials.

12. The system of claim 11, wherein the reel further comprises a central support member extending along the rotational axis, the central support member being formed from the one or more radar-transparent materials, wherein the central support member is at least partially positioned within the field of view of the radar sensor.

13. The system of claim 11, wherein the reel further comprises at least one radial support member coupled to the plurality of tine bar assemblies and being configured to support the plurality of tine bar assemblies relative to the rotational axis, the at least one radial support member being formed from the one or more radar-transparent materials, wherein the central support member is at least partially positioned within the field of view of the radar sensor.

14. The system of claim 11, wherein each tine bar assembly comprises a tine support member and a plurality of tines coupled to the tine support member and wherein the one or more radar-transparent materials comprises a first type of radar-transparent material and a second type of radar-transparent material, the plurality of tines of each tine bar assembly being formed from the first type of radar-transparent material and the tine support member of each tine bar assembly being formed from the second type of radar-transparent material.

15. The system of claim 14, wherein the first type of radar-transparent material comprises a radar-transparent polymer material and the second type of radar-transparent material comprises a radar-transparent composite material.

16. The system of claim 10, further comprising a controller communicatively coupled to the radar sensor, the controller being configured to monitor the one or more parameters associated with the header based on data received from the radar sensor.

17. The system of claim 16, wherein the controller is further configured to control an operation of one or more components associated with the header based on the one or more monitored parameters.

18. The system of claim 10, wherein the one or more parameters comprises a height of the header relative to the ground.

19. The system of claim 1, wherein the radar sensor comprises a header height sensor configured to provide data indicative of a height of a portion of the header relative to the ground.

20. The header of claim 8, wherein the radar sensor comprises a header height sensor configured to provide data indicative of a height of a portion of the header relative to the ground.

* * * * *